(No Model.)
H. C. POTTER.
CIRCULAR DIAMOND SAW AND SAW TOOTH.
No. 570,564. Patented Nov. 3, 1896.
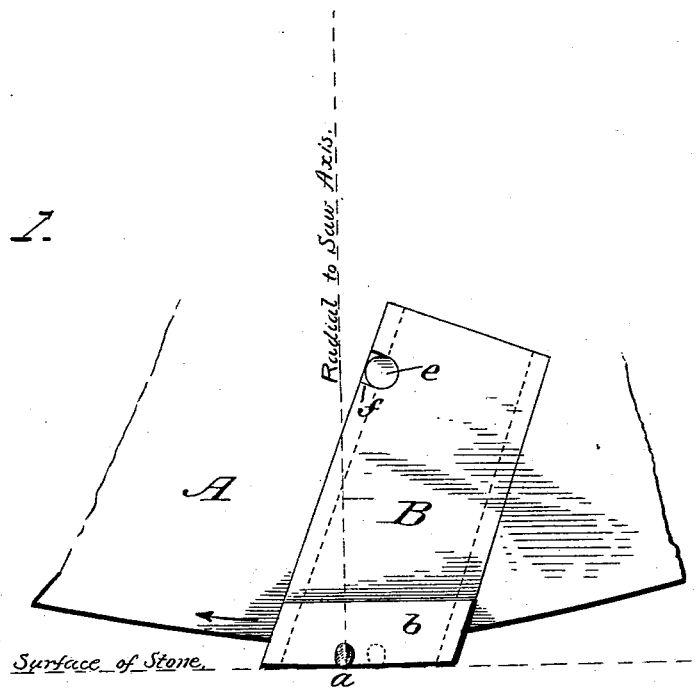
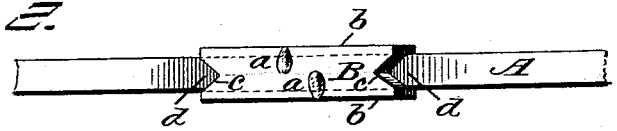
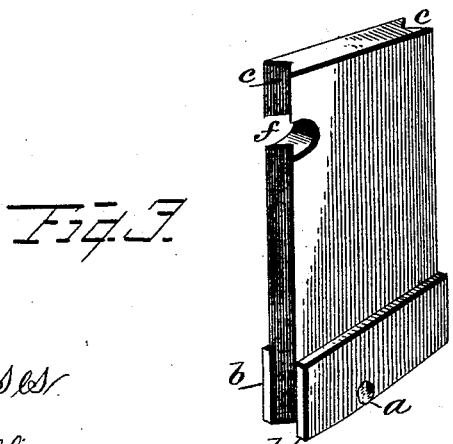
Witnesses
C. J. Williamson
Geo. S. Baker
Inventor
Hubbard C. Potter.
per Chas. H. Fowler.
Attorney.

UNITED STATES PATENT OFFICE.

HUBBARD C. POTTER, OF NEW YORK, N. Y.

CIRCULAR DIAMOND SAW AND SAW-TOOTH.

SPECIFICATION forming part of Letters Patent No. 570,564, dated November 3, 1896.

Application filed December 28, 1895. Serial No. 573,641. (No model.)

*To all whom it may concern:*

Be it known that I, HUBBARD C. POTTER, a citizen of the United States, residing at New York, in the county of New York and State of New York, have invented certain new and useful Improvements in Circular Diamond Saws and Saw-Teeth; and I do hereby declare that the following is a full, clear, and exact description of the same, reference being had to the annexed drawings, making a part of this specification, and to the letters of reference marked thereon.

The present invention has relation to that class of circular saws provided with insertible and removable diamond cutting-teeth; and it consists in a circular saw and teeth inserted therein and constructed substantially as shown in the drawings and hereinafter described and claimed.

Figure 1 of the drawings represents a side view of a portion of a circular saw or plate, showing one of the teeth in position relatively to the periphery of the saw and the radius thereof, a vertical dotted line showing the radius to the axis of the saw and a horizontal dotted line representing the surface of the stone; Fig. 2, an edge view of Fig. 1; Fig. 3, a detail view in perspective of the saw-tooth.

In the accompanying drawings, A represents a portion of a saw or saw-plate, and B one of the diamond cutting-teeth connected thereto, so that it will assume an angle to the radius of the saw, or, in other words, obliquely to the periphery of the saw, as shown in Fig. 1 of the drawings, thereby more effectually holding the tooth in place and preventing the liability of the tooth being cast off during the rapid revolution of the periphery of the saw when out of the stone which is being sawed.

Were the tooth set in the saw or saw-plate at a right angle to the periphery thereof or radial to the saw-axis the tendency would be to loosen the fastening and the tooth be thrown out by centrifugal force, as when the saw is in the stone the strain on the rivet or other fastening would be in a direction toward the center of the saw or on a line radial to the axis thereof, thus bringing a greater strain on the fastening and the liability of loosening it, resulting in the casting off of the tooth.

It has been found that by setting the tooth at an angle to the radius of the saw or obliquely to the periphery thereof the liability of casting off the tooth during the rapid rotation of the saw is materially lessened.

This saw-tooth B has diamond or carbon points, as shown at *a*, which are preferably held in the tooth by casting the metal around the pieces of carbon during the process of forming the tooth.

The tooth is slightly tapering, its greater width being at its cutting end, said end having shoulders *b* on its sides of sufficient thickness to project beyond the sides of the saw-plate, as shown in Fig. 2 of the drawings.

The longitudinal edges of the tooth have grooves *c* in form to correspond with the tongues *d* upon the sides of the opening in which the tooth is to be inserted, thereby holding the tooth against lateral displacement. These grooves and tongues may be of V shape or of any other form found most preferable, and when the tooth is in place it is secured against longitudinal displacement by means of a rivet *e*, entering a notch *f* in one edge of the tooth.

The tooth B at its cutting end projects slightly beyond the edge of the saw-plate, so as to more effectually do its work when in the stone, the shoulders *b* materially strengthening the tooth at the point where most needed and also leaving a space between the sides of the saw-plate and the stone for the passage of the water from the center to the periphery of the saw and avoid friction.

The slight taper to the saw-tooth enables it to fit more tightly in the space formed to receive it than were the tooth of the same width throughout its length.

It will be noticed that the diamond or carbon points are set in the saw-tooth so that they will be exposed upon the face and side thereof, whereby a channel will be cut of sufficient width to admit of a free flow of water along its sides from the center to the periphery of the saw. This, in connection with the shoulders upon the sides of the tooth, coacts to maintain the width of the channel for the admission of water to the stone; also the shouldered end of the tooth projecting beyond the periphery of the saw-plate admits an accumulation of water in the channel in front of the tooth while the saw is in motion, thereby preventing any possibility of heating of the tooth.

The tapering form of the tooth admits of the tooth when driven into the opening or recess becoming perfectly solid with the blade and prevents it becoming loose when the saw is running at a high rate of speed. The tooth also fills the recess and rests upon the bottom thereof, thereby bringing the pressure upon the inner end of the tooth and preventing any possibility of vibration.

Having now fully described my invention, what I claim as new, and desire to secure by Letters Patent, is—

1. A tapering saw-tooth of increased thickness at its outer end so as to present a point and shoulders which will project beyond the circumference and side faces of the saw-disk when connected thereto, and diamond or carbon points mounted upon the end of the tooth, substantially as and for the purpose set forth.

2. A circular saw having oblique tapering openings or recesses, and tapering teeth secured and fitted solidly therein, the inner ends of the teeth resting against the bottom of the openings or recesses, the outer end of the tooth having shoulders upon its sides which project beyond the surfaces and periphery of the saw, and diamond or carbon points upon the teeth, substantially as and for the purpose specified.

3. The combination with a circular-saw disk having its peripheral line interrupted only by tapering openings or recesses oblique to the radii of the saw, of a saw-tooth of a size and form corresponding to and fitting solidly within one of said openings or recesses and made of increased thickness at its outer end so as to present a point and shoulders projecting beyond the circumference and side faces of the saw-disk, and diamond or carbon points mounted upon the ends of the teeth, substantially as described.

In testimony that I claim the above I have hereunto subscribed my name in the presence of two witnesses.

HUBBARD C. POTTER.

Witnesses:
 CHARLES A. WINTER,
 WILLIAM C. BREED.